United States Patent
Rajasekaran

(10) Patent No.: US 10,714,119 B2
(45) Date of Patent: Jul. 14, 2020

(54) COMMUNICATION DEVICE AND COMMUNICATION SYSTEM

(71) Applicant: Plantronics, Inc., Santa Cruz, CA (US)

(72) Inventor: Arun Rajasekaran, Saratoga, CA (US)

(73) Assignee: Plantronics, Inc., Santa Cruz, CA (US)

( * ) Notice: Subject to any disclaimer, the term of this patent is extended or adjusted under 35 U.S.C. 154(b) by 0 days.

(21) Appl. No.: 16/386,089

(22) Filed: Apr. 16, 2019

(65) Prior Publication Data

US 2019/0244632 A1 Aug. 8, 2019

Related U.S. Application Data

(63) Continuation-in-part of application No. 15/684,663, filed on Aug. 23, 2017, now Pat. No. 10,405,080, which is a continuation-in-part of application No. 15/457,236, filed on Mar. 13, 2017, now Pat. No. 10,063,959.

(51) Int. Cl.
*G10L 25/72* (2013.01)
*G10L 15/02* (2006.01)

(52) U.S. Cl.
CPC .............. *G10L 25/72* (2013.01); *G10L 15/02* (2013.01)

(58) Field of Classification Search
CPC ... H04R 1/1041; H04R 2420/07; G06F 3/162; G01H 3/14; H03G 3/001; H03G 11/08
USPC ................... 381/74, 104, 123, 56; 709/217; 455/355; 379/390.01
See application file for complete search history.

(56) References Cited

U.S. PATENT DOCUMENTS

| | | | |
|---|---|---|---|
| 6,826,515 B2 | 11/2004 | Bernardi et al. | |
| 7,013,011 B1 | 3/2006 | Weeks et al. | |
| 7,200,238 B1 | 4/2007 | Shyu et al. | |
| 8,369,535 B1 | 2/2013 | Shyu et al. | |
| 8,391,503 B2 | 3/2013 | Bayley et al. | |
| 8,983,081 B2 | 3/2015 | Bayley et al. | |
| 9,980,028 B2 | 5/2018 | McNeill et al. | |
| 2001/0046304 A1* | 11/2001 | Rast | H04R 1/1041 381/74 |
| 2003/0002688 A1* | 1/2003 | Kanevsky | H04R 3/00 381/74 |
| 2006/0147049 A1 | 7/2006 | Bayley et al. | |

(Continued)

OTHER PUBLICATIONS

Unknown, "Acoustic Safety for Telephone Equipment," Industry Guideline ACIF G616:2006, Jan. 2006, 30 pages.

(Continued)

*Primary Examiner* — Melur Ramakrishnaiah
(74) *Attorney, Agent, or Firm* — Thomas S. Diewiebel; Slayden Grubert Beard, PLLC

(57) ABSTRACT

A communication device for a communication system is disclosed, which communication device comprises at least an I/O interface for connection with one or more audio sources to at least receive an input audio signal, a user audio output, an audio processor to provide an output audio signal to the user audio output from the input audio signal, and a reporting module. To improve the acoustic safety for a user of the communication device, the reporting module is configured to analyze the input audio signal and to determine, whether an acoustic safety incident is given, upon which the reporting module is configured to generate metadata of the acoustic safety incident.

20 Claims, 8 Drawing Sheets

(56) References Cited

U.S. PATENT DOCUMENTS

| | | | |
|---|---|---|---|
| 2006/0222185 A1* | 10/2006 | Dyer | H04R 29/001 381/74 |
| 2007/0024700 A1 | 2/2007 | Lim et al. | |
| 2008/0130906 A1 | 6/2008 | Goldstein et al. | |
| 2008/0159547 A1 | 7/2008 | Schuler et al. | |
| 2008/0253583 A1 | 10/2008 | Goldstein et al. | |
| 2011/0222710 A1 | 9/2011 | Biswas et al. | |
| 2013/0101125 A1 | 4/2013 | Peters et al. | |
| 2014/0161264 A1* | 6/2014 | Kirkbak | G08B 21/182 381/56 |
| 2015/0065055 A1 | 3/2015 | Newham et al. | |
| 2017/0374444 A1* | 12/2017 | McNeill | H04R 1/1083 |

OTHER PUBLICATIONS

International Search Report and Written Opinion issued in PCT Application No. PCT/US2018/020782 dated May 11, 2018 (9 pages).

International Search Report and Written Opinion issued in PCT Application No. PCT/US0218/020781 dated Apr. 12, 2018 (7 pages).

European Examination Report for EP Application No. 18767067.4, dated Sep. 2, 2019 (6 pages).

European Search Report for EP Application No. 18767067.4, dated Aug. 6, 2019 (4 pages).

* cited by examiner

COMMUNICATION DEVICE AND COMMUNICATION SYSTEM

CROSS-REFERENCE TO RELATED APPLICATIONS

The present application is a continuation-in-part application claiming the benefit of U.S. patent application Ser. No. 15/684,663, entitled "COMMUNICATION HUB AND COMMUNICATION SYSTEM", having a filing date of Aug. 23, 2017, which U.S. patent application is a continuation-in-part application of U.S. patent application Ser. No. 15/457,236, entitled "HEADSET SYSTEM WITH ACOUSTIC SAFETY INCIDENT DETECTION", filed on Mar. 13, 2017. The contents of the aforesaid applications are incorporated herein by reference for all purposes.

TECHNICAL FIELD

The present invention relates to the field of acoustic safety and in particular to acoustic safety for users of communication devices.

BACKGROUND

This background section is provided for the purpose of generally describing the context of the disclosure. Work of the presently named inventors, to the extent the work is described in this background section, as well as aspects of the description that may not otherwise qualify as prior art at the time of filing, are neither expressly nor implicitly admitted as prior art against the present disclosure.

Acoustic safety of users of communication devices, such as headsets, phone handsets, or "hub" devices, is gaining attention in recent years due to the rising use of such devices, e.g., for telecommunication applications and consuming audio, as well as due to an increase in hearing-related health issues.

In view of the above, official guidelines for workplace safety in various countries provide maximum sound pressure levels for workplace environments, which should not be exceeded. Accordingly, some types of modern telecom office equipment, such as phones and headsets, allow for safety monitoring and/or control to assure that the output audio stays below the recommended maximum levels.

In view of the severe consequences of damage to the hearing of a user, an object exists to improve the acoustic safety for users using communication devices.

SUMMARY

The following summary of the present invention is provided to facilitate an understanding of some of the innovative features unique to the present invention and is not intended to be a full description. A full appreciation of the various aspects of the invention can be gained by taking the entire specification, claims, drawings, and abstract as a whole.

According to one aspect, a communication device for a communication system is provided. The communication device comprises at least an I/O interface for connection with one or more audio sources to at least receive an input audio signal, a user audio output, an audio processor to provide an output audio signal to the user audio output from the input audio signal, and a reporting module, configured to analyze the input audio signal and to determine, whether an acoustic safety incident is given, upon which the reporting module is configured to generate metadata of the acoustic safety incident.

One basic idea of the above aspect is to provide a reporting functionality directly within a communication device, so that an acoustic safety incident can be safely determined by the communication device itself. Metadata, related to the acoustic safety incident is generated when such acoustic safety incident is determined.

This aspect and other aspects of the invention will be apparent from and elucidated with reference to the embodiments described hereinafter.

DETAILED DESCRIPTION OF PREFERRED EMBODIMENTS

Figure 1:
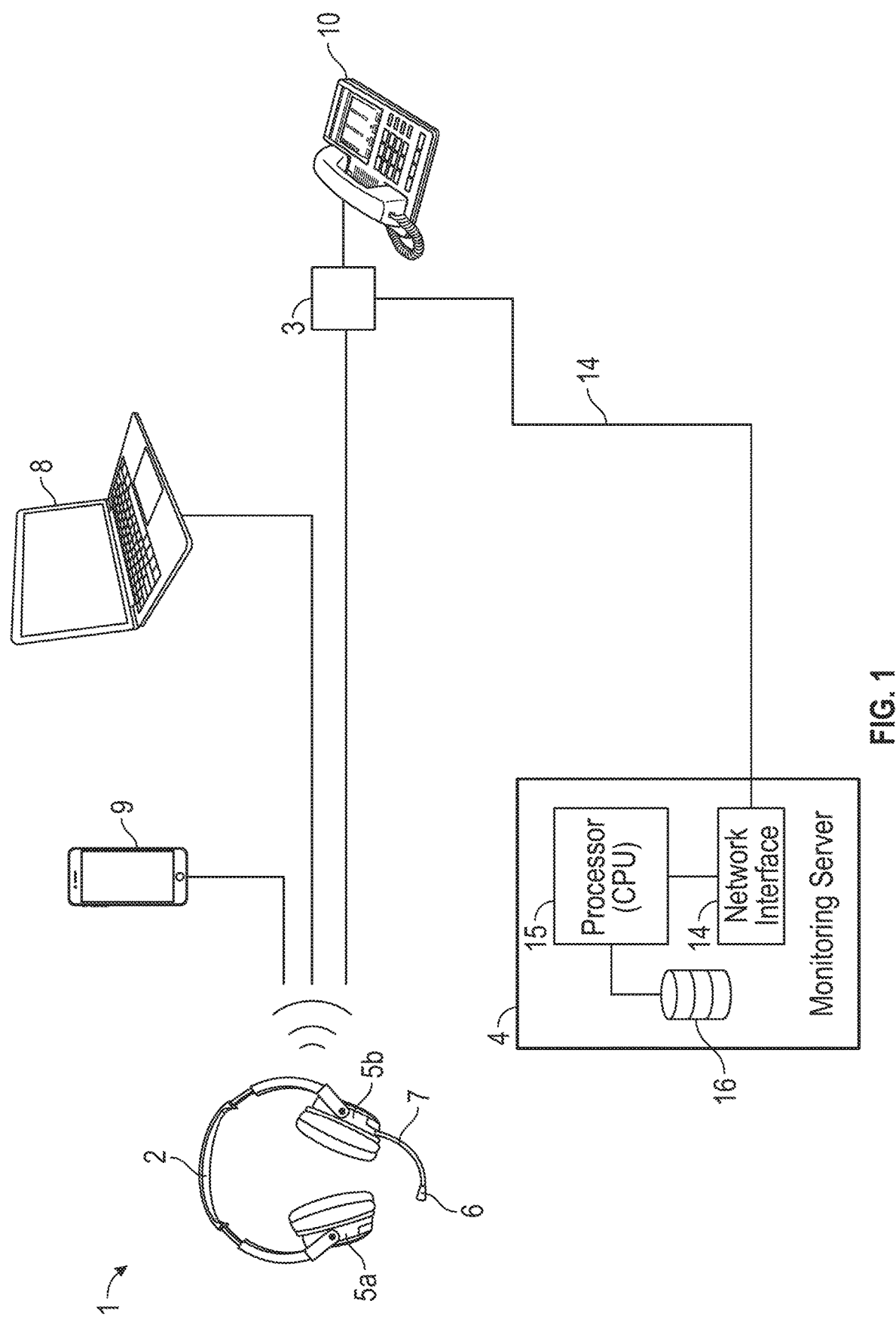
FIG. 1 shows a first embodiment of a communication system with a headset, and a monitoring server in a schematic block diagram.

Technical features described in this application can be used to construct various embodiments of communication hubs, communication systems, and methods of audio processing according to the preceding and following description. Some embodiments of the invention are discussed so as to enable one skilled in the art to make and use the invention.

In the following description, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between like-named elements. For example, a first element is distinct from a second element, and the first element may encompass more than one element and succeed (or precede) the second element in an ordering of elements.

In the following explanation of the present invention according to the embodiments described, the terms "connected to" or "connected with" are used to indicate a data and/or audio connection between at least two components, devices, units, or modules. Such a connection may be direct between the respective components, devices, units, or modules; or indirect, i.e., over intermediate components, devices, units, or modules. The connection may be permanent or temporary; wireless or conductor based.

For example, a data and/or audio connection may be provided over a WAN (wide area network), LAN (local area network), PAN (personal area network), BAN (body area network) comprising, e.g., the Internet, Ethernet networks, cellular networks, such as LTE, Bluetooth (classic, smart, or low energy) networks, DECT networks, ZigBee networks, and/or Wi-Fi networks using a corresponding suitable communications protocol. In some embodiments, a USB connection, a PSTN connection, a line audio connection, a Bluetooth network connection and/or a DECT connection is used to transmit audio and/or data.

In the present context, the term "communication system" may comprise networks, systems, and devices for communication purposes, such as a mobile phone, a soft-phone system, a desk phone that, e.g., terminates a telephone (PSTN) network or participates in a VOIP network, and combinations thereof. Certainly, the present discussion is not limited to the preceding examples.

In the present explanation, a communication device is understood as a device that is designed to participate in a communication system and that allows a user to interface with the communication system. For example, the communication device may in some embodiments be a headphone, a loudspeaker, a (phone) handset, or a "communication hub" device that interfaces between the communication system and an, e.g., passive headset or loudspeaker of the user.

In the context of this application, the term "headset" refers to all types of headsets, headphones, and other head worn audio playback devices, such as for example circumaural and supra aural headphones, ear buds, in ear headphones, and other types of earphones. The headset may be of mono, stereo, or multichannel setup. A microphone may or may not be provided as part of a headset in the context of this explanation.

The terms "audio signal" and "audio stream" in the present context refer to an analogue or digital representation of audio. For example, the audio signals described herein may be of pulse code modulated (PCM) type, or any other type of bit stream signal. Each audio signal may comprise one channel (mono signal), two channels (stereo signal), or more than two channels (multichannel signal). The audio signal may be compressed or not compressed.

According to one exemplary aspect, a communication device for a communication system is provided. The communication device comprises at least an I/O interface for connection with one or more audio sources to at least receive an input audio signal, a user audio output, an audio processor to provide an output audio signal to the user audio output from the input audio signal, and a reporting module, configured to analyze the input audio signal and to determine, whether an acoustic safety incident is given, upon which the reporting module is configured to generate metadata of the acoustic safety incident.

According to the preceding, the communication device comprises an I/O interface for connection with one or more audio sources to at least receive an input audio signal. The I/O interface may be of any suitable type and may be adapted to use one or more of the audio connections, discussed in the preceding, such as a Bluetooth or a line audio connection, or any other suitable digital or analog audio connection.

The communication device further comprises the audio processor to provide an output audio signal to the user audio output. The output audio signal is generated from the input audio signal. This may in some embodiments include additional processing of the audio, such as gain adaptation, limiting, compressing, mixing of different audio sources and corresponding input audio signals, or a combination of the aforementioned processing methods. In other embodiments, the audio processor provides no additional audio processing. In these embodiments, the output audio signal is close to a 1:1 copy of the input audio signal.

The audio processor is connected at least temporarily with the I/O interface and the user audio output and may be of any suitable type to provide the output audio signal from an input audio signal. For example, the audio processor may be a Digital Signal Processor (DSP).

The audio processor in one embodiment is a DSP, adapted to process the input audio signal(s). Further embodiments provide that the processor is configured for volume change, data format change, limiter functionality, and/or compressor/decompressor functionality.

The audio I/O interface is configured for connection with one or more respective external devices, i.e., the one or more audio sources. In some embodiments, the one or more audio sources comprise "communication sources", such as a phone, e.g., a PSTN (desk) phone, a mobile phone, but also a direct connection to a PSTN line, a VOIP line or interface, and a computer with suitable communication software. It is noted that in some embodiments, a corresponding communication source, connected with the I/O interface, may be formed as an (integrated) component of the communication device. For example, a softphone client could be provided as programming for execution by a processor, microcontroller, etc.

The user audio output in some embodiments provides audio to a user. In these embodiments, the user audio output may comprise an amplifier circuit and corresponding loudspeakers. In some embodiments, the communication device may be a headset or a conferencing device. In other embodiments, the user audio output allows a conductor-based or wireless connection to one or more external devices, such as speakers, headsets, etc. The communication device may in these embodiments may also be referred to as a "communication hub", i.e., an intermediate device between the audio source and the device that interfaces with the user's ears. Any connection, discussed in this paragraph may be temporary or permanent. For example and in case of a temporary connection, the interface or output may comprise suitable sockets for a detachable connection with corresponding plugs.

In some embodiments, the communication device may also be configured to record user audio, in addition to providing audio playback to the user. In some embodiments, a user audio input may be provided to obtain a microphone input signal, which is passed, either directly or through intermediate components, such as the audio processor, to the I/O interface. In some embodiments, the user audio input is a microphone. In other embodiments, the user audio input allows connection of an external microphone, provided either as a conductor-based connection or a wireless connection.

The communication device according this aspect further comprises the reporting module, configured to analyze the input audio signal and to determine, whether an acoustic safety incident is given or at least likely. In case an acoustic safety incident is given and in some embodiments, the reporting module generates metadata of at least the acoustic safety incident.

In the present context, the term "metadata" refers to data about at least the input audio signal. In some embodiments, the metadata comprises at least information relating to the sound pressure level that would be provided to the user during the acoustic safety incident. It is noted, that the metadata in some embodiments corresponds to the unprocessed input audio signal. Thus, any processing by the audio processor, such as by a limiting algorithm, does not affect the metadata in these embodiments. In some embodiments, the metadata comprises both, information about the unprocessed input signal as well as the correspondingly processed output audio signal. This embodiment thus allows to verify the processing settings of the audio processor.

In further embodiments, the metadata comprises information relating to sound pressure level over frequency and/or time. In additional or alternative embodiments, the metadata comprises information relating to whether the sound pressure level exceeded one or more predefined threshold levels. In further additional or alternative embodiments, call-control events of the communication system are comprised in the metadata, such as on-hook, off-hook, mute and/or device events, e.g., key-presses, don/doff state, or other call-control or device events. In further additional or alternative embodiments, the metadata comprises audio parameters, such as one or more of receive Automatic Gain Control (AGC) information and headset modeling filter (HMF) information, in particular headset modeling filter information.

In the present context, the term "acoustic safety incident" may refer to an event that caused acoustic shock and/or that exceeded one or more predefined audio safety thresholds, such as for example those defined in ACIF G616:2006—Acoustic safety for telephone equipment. Further examples are discussed in the following, in particular with reference to the discussion of the FIGS. and the shown embodiments. It is noted that depending on the respective example, the determination of an acoustic safety incident does not necessarily mean direct damage to the user's hearing. A predefined audio safety threshold may in some embodiments be defined so that a safe level is not exceeded, i.e., lower than a level that would provide direct hearing damage.

It is noted that the term "module" as used herein may refer to a collection of routines, functions, and/or data structures that perform a particular task or implements a particular abstract data type. Modules may be composed of two parts: 1) an interface that lists the constants, data types, variables, and routines/functions that can be accessed by other modules, devices, or routines/functions and 2) an implementation that is typically private, accessible only to that module, and includes source code that actually implements the routines/functions in the module. The term "module" may also simply refer to an application, such as a computer program, to assist in the performance of a specific task. In other examples, at least part of the module may be implemented by "hard-wired" logic circuitry, hardware, or other circuitry.

In some embodiments, the reporting module is formed integrally with the audio processor of the communication device. In other embodiments, the reporting module is formed in another processing device of the communication hub.

The communication device in further embodiments may comprise additional components. For example, the communication device in some exemplary embodiments may comprise one or more of a microphone to obtain user audio from the user, additional control electronics to process audio, a wireless communications interface, a central processing unit, and a battery.

In other embodiments, the audio I/O interface is configured for connection with a plurality of audio sources. The connection to the plurality of audio sources in these embodiments may be simultaneous or switchable.

In case of a switchable connection, only one of the plurality of input audio signals of the plurality of audio sources is provided to the audio output at a time. The communication device in a further embodiment may comprise a user interface. Alternatively, the user interface may be present on a connected computing device that allows the user to select the audio source. Alternatively or additionally, the processor of the communication device may be configured to automatically select the audio source that is "forwarded", e.g., by analyzing whether the audio source is currently active. In case of a simultaneous connection and in further embodiments, the processor mixes the plurality of input audio signals into a single user input audio signal.

In both instances, the reporting module generates metadata of at least one input audio signal. In a further embodiment, the reporting module generates metadata of all input signals. In another embodiment, the reporting module generates metadata of the user input audio signal. In some embodiments, the reporting module is configured to generate metadata of both, the input audio signal and the output audio signal.

In some embodiments, the communication device is further configured to transmit the metadata to a monitoring device, for example to a monitoring device of the communication system. The transmission, in some embodiments, may be conducted by the reporting module.

The metadata is provided to the monitoring device over a suitable data connection. This data connection may be of permanent type or of temporary type. In the latter case, metadata in an embodiment is temporarily stored in the communication device, e.g., in a suitable memory device of the communication device and/or the reporting module, and then transmitted in regular or irregular intervals to the monitoring device. In some embodiments, the reporting module also generates metadata of a microphone input signal, such as acquired from one or more microphones of a headset and as discussed in further detail in the following.

The monitoring device may be of any suitable type, e.g., a computing device, to provide the functionality described. The monitoring device may be co-located with the communication device or located at a remote and/or central facility in corresponding embodiments. In some embodiments, the monitoring device is a monitoring server, which is understood to include cloud-based monitoring services. Certainly, the server may provide additional functions in additional embodiments, such as directory and/or configuration functions.

In some embodiments, the communication device comprises a network interface for connection with the monitoring device. The network interface may be of any suitable type to connect to the monitoring device using a wireless or conductor-based data connection, such as wired or wireless WAN or LAN connectivity technology. In other embodiments, the communication device connects to the monitoring device over an intermediate device, such as a connected computer or smart phone. In these embodiments, the communication hub may use the data connection of the connected intermediate device for connection to the monitoring device.

The reporting module in some embodiments may be configured to determine the sound pressure level from analyzing the input audio signal together with settings of the communication device, such as amplifier or gain (e.g., AGC) settings. In further embodiments, the reporting module is connected to a microphone that is arranged to monitor the actual sound pressure level provided to the user during operation.

According to some embodiments, the reporting module is further configured to capture an input audio snippet of the input audio signal upon determination of an acoustic safety incident. In the present embodiments, the reporting module, in addition to generating metadata of the input audio signal also captures or records an excerpt of the input audio signal, i.e., a "snippet", clip, or "sound bite". The snippet may be of any suitable length. In some embodiments, the snippet is temporarily or permanently stored in any suitable format In some embodiments, the reporting module captures the input audio snippet of the input audio signal so that the input audio snippet comprises the determined acoustic safety incident. In some embodiments, the input audio snippet has a configurable capture recording length, that covers at least the acoustic safety incident, i.e., the recording is sufficient to fully comprise the respective acoustic safety incident.

In some embodiments, the reporting module comprises a recording buffer. The recording buffer may operate as a circular buffer or FIFO (first-in-first-out) buffer, so that a pre-defined past time period of the input audio signal is stored. This makes it easier to, once an acoustic safety incident is determined, capture the input audio snippet and make sure that the acoustic safety incident is completely covered. For example, the buffer may in one embodiment be configured to store the last 60 seconds of the input audio signal. In some embodiments, the buffer has a configurable depth. For example, the buffer may have a recording depth of up to 15 minutes.

In some embodiments, the audio snippet has a capture recording length that covers the acoustic safety incident and a predefined and/or configurable lead-in and lead-out times. The present embodiments provide an improved capture of the input audio snippet. In some embodiments, the lead-in and lead-out time is configurable. In some embodiments, the lead-in and lead-out time is between 1-2000 ms. In some embodiments, the lead-in and lead-out time is 500 ms.

According to some embodiments, the reporting module is further configured to capture an output audio snippet of the output audio signal upon determination of an acoustic safety incident. The output audio snippet may be captured in some embodiments instead of the input audio snippet. In other embodiments, the output audio snippet may be captured in addition to the input audio snippet. With respect to further embodiments referring to the output audio snippet, reference is made to the preceding discussion of embodiments pertaining to the input audio snippet.

In some embodiments, the reporting module is configured to transmit the metadata, the input audio snippet, and/or the output audio snippet to the monitoring device of the communication system. The transmission of audio snippets is very efficient based on bandwidth considerations, in particular over a transmission of the entire input audio signal to the monitoring device. The transmission of audio snippets also saves storage space on the monitoring device and by sending just the relevant audio snippets provides more privacy compared with a transmission of the entire input audio signal.

The metadata and the input audio snippet may be transmitted in one or in multiple communications using the same or different communication channels. In some embodiments, one or more audio snippets are compressed before transmission. In some embodiments, one or more audio snippets are encrypted before transmission. In some embodiments, one or more audio snippets are encoded before transmission.

In some embodiments, each audio snippet is assigned an incidence ID (e.g., a unique or quasi-unique identifier) that allows to relate the respective audio snippets with the corresponding metadata. In some embodiments, the monitoring device is configured to generate a report about acoustic safety incidents. In some embodiments, the report comprises one or more of enablement/disablement of reporting in a given communication device, pre-limiter threshold to be met before an acoustic safety incident is determined, and acoustic safety incident duration to be met before an acoustic safety incident is determined.

In some embodiments, the monitoring server comprises an acoustic incident database and is configured to record received metadata and associated audio snippets in the acoustic incident database. This allows for a later audit, if necessary.

In some embodiments, the audio processor comprises an acoustic safety module, the acoustic safety module being configured to process the input audio signal to obtain the output audio signal so as to reduce acoustic shocks.

In the context of the present invention, the term "acoustic shock" is understood as an event that results in damage to the user's hearing and that is caused by audio, provided from the respective audio signal. The damage can be direct, i.e., short-term damage, or indirect, i.e., long-term damage to the user's hearing. An acoustic shock may in general be influenced by the loudness or sound pressure level of the received sound, the suddenness of an increase in sound pressure level, the duration of the increase in sound pressure level, the frequency/frequencies of the sound, the background noise level in the user's vicinity, and or the nature and unexpectedness of the sound.

To provide a reduction of acoustic shock and in some embodiments, the acoustic safety module comprises at least one of an audio limiter, an audio compressor, and an audio "dosage" limiter to reduce the sound pressure level of the output audio to safe levels. For example, the acoustic safety module may comprise a sound pressure level limiter, as disclosed in US 2006/0147049 A1, discussed in the preceding. The mentioned audio dosage limiter provides limited overall audio exposure during a given time, such as a user's workday.

In some embodiments, the acoustic safety module may be configurable. For example, the settings of the mentioned audio limiter, audio compressor, and/or audio dosage limiter may be adjustable. In some embodiments, the settings of the acoustic safety module may be adjustable by a user, e.g., with a local or remote user interface. In some embodiments, the settings of the acoustic safety module may be adjustable by the monitoring device. In these embodiments, the monitoring device in some embodiments may be configured to analyze the received metadata of a (previous) acoustic safety incident, as well as any audio snippets related thereto, and determine settings of the acoustic safety module from this analysis.

In some embodiments, the monitoring device is configured to provide a safety notification in case an acoustic safety incident is determined by the reporting module. The safety notification may be of any suitable type, for example a corresponding electronic message, such as an instant message or e-mail. In some embodiments, the safety notification is provided to the user of the communication device, where the acoustic safety incident originated. In other additional or alternative embodiments, the safety notification is provided to a safety officer and/or IT manager of the respective organization where the communication device is used. In some embodiments, the safety notification is provided to a database system to update a safety database. Certainly, it is in corresponding embodiments possible that the safety notification is provided to multiple recipients, such as the above.

In some embodiments, the monitoring device is configured to identify patterns from the received audio snippet(s). This embodiment may help to identify—for example in a call center environment—specific users who receive unsafe audio regularly and/or to identify specific sources of audio that emanate unsafe audio regularly.

In some embodiments, the monitoring device is configured to conduct an acoustic incident classification, in which the monitoring device classifies the respectively received acoustic safety incidents to allow further analysis. For example, the monitoring device may be configured to classify each acoustic safety incident into classes, such as fax tones, alarms (smoke, fire, CO), emergency operations (ambulance, police, fire truck), etc.

In some embodiments, the monitoring device is configured to detect the acoustic environment of a given acoustic safety incident. For example, the monitoring device may be configured to determine whether the acoustic safety incident occurred outdoors or indoors.

In some embodiments, the monitoring device is configured to disable the communication device at which the acoustic safety incident occurred. For example, the monitoring device may be configured to determine a severe acoustic safety incident and then disable the communication device. In one example, the monitoring device is configured with a second, predefined threshold, i.e., a severe acoustic safety threshold, which is higher than the predefined audio safety threshold. In this example, any acoustic safety incident that surpasses the severe acoustic safety threshold results in that the respective communication device is disabled. In alternative or additional embodiments, the monitoring device is configured to determine a predefined regularity, a predefined duration, and/or a predefined overall number of acoustic safety incidents at a given communication device and disable the communication device when a predefined occurrence threshold is met. In one example, the determination of more than two acoustic safety incident in one hour leads to a device disablement. In another example, a duration of acoustic safety incident of more than 1 second leads to a device disablement. In a combination example, the occurrence of more than two acoustic safety incidents of more than 1 second duration will result in that the respective communication device is disabled.

In some embodiments, the monitoring device sends a user information and/or an operator information when a communication device is disabled, so that the device may be subjected to, e.g., servicing.

In some embodiments, the acoustic safety module is mode-switchable. The term "mode-switchable" in this context denotes that the acoustic safety module can be switched at least from an un-operational mode (OFF or disabled mode) to an operational mode (ON or enabled mode) and vice versa. Certainly, the mode-switchable acoustic safety module in corresponding embodiments may be configured with more than the two above, i.e., ON and OFF modes. The acoustic safety module may be configurable and mode-switchable by the monitoring device.

The discussed reduction of acoustic shocks is provided in the operational mode(s), although it is noted that a basic reduction of acoustic shocks may be provided even in the un-operational mode in a corresponding embodiment, for example using an acoustic limiting integrated chip (ALIC). In this case, the operational mode provides improved reduction of acoustic shocks. In one embodiment, the ALIC provides a reduction of acoustic shocks for sound levels above 118 dB SPL (using, e.g., a "limiter function") even in the un-operational mode, while the mode-switchable acoustic safety module provides a reduction of acoustic shocks for sound levels above 98 dB SPL in the operational mode. With regard to the reduction of acoustic shock, reference is made to U.S. patent publication US 2006/0147049 A1, "SOUND PRESSURE LEVEL LIMITER WITH ANTI-STARTLE FEATURE", published on Jul. 6, 2006, which is incorporated herein in its entirety.

According to some embodiments, the reporting module is configured to generate metadata of the audio signal(s) in case the acoustic safety module is in the enabled or in the disabled state. According to some embodiments, the reporting module is configured to generate metadata of the audio signal(s) in all operational states of the acoustic safety module, i.e., independent of the state of the acoustic safety module.

According to some further embodiments, the monitoring device is configured to enable the mode-switchable acoustic safety module of at least one communication device in case an acoustic safety incident is determined. The resulting automatic operation of the monitoring device allows a particularly quick reaction to acoustic safety incidents and thus to avoid future incidents in case an acoustic safety incident is determined. Certainly, the safety notification, as discussed in the preceding, may in some embodiments also be provided in case of an automatic enabling of the mode-switchable acoustic safety module to provide awareness of the incident and/or the fact that the acoustic safety module was enabled automatically.

In some embodiments, the monitoring device enables the mode-switchable acoustic safety module by providing a corresponding control signal or control command to the respective processor. Correspondingly in this embodiment, the monitoring device is at least temporarily connected with the processor and the mode-switchable acoustic safety module, respectively.

In some embodiments, the communication system comprises one or more communication sources, connected to the at least one communication device to provide at least one input audio signal, wherein the one or more audio sources are formed separate from the monitoring device. The present example of a separate, e.g., spaced or remote, arrangement of the monitoring device from the audio source allows to keep the audio sources and the corresponding signals local in the vicinity of the respective communication devices, while it is possible to provide the monitoring device, e.g., in a remote facility. The one or more audio sources may be of any suitable type, for example a desk phone, a mobile phone, a computer, a tablet.

According to a further exemplary aspect, a communication system with at least a communication device and a monitoring device is provided. The communication device according to this aspect comprises at least an audio I/O interface for connection with one or more communication sources to at least receive an input audio signal, a user audio output an audio processor to provide an output audio signal to the user audio output from the input audio signal, and a reporting module, configured to analyze the input audio signal and to determine, whether an acoustic safety incident is given, upon which the reporting module is configured to generate metadata of the acoustic safety incident. The reporting module is further configured to transmit the metadata to the monitoring device. The monitoring device in some embodiments may be configured to analyze the metadata.

The communication system and in particular the one or more communication devices and the monitoring device according to the present aspect and in further embodiments may be configured according to one or more of the embodiments, discussed in the preceding with reference to the preceding aspect. With respect to the terms used for the description of the present aspect and their definitions, reference is made to the discussion of the preceding aspect.

According to another exemplary aspect, a method of operating a communication device is provided. The communication device comprises at least an I/O interface for connection with one or more communication sources to at least receive an input audio signal, an user audio output, and an audio processor to provide an output audio signal to the user audio output from the input audio signal. According to the present aspect, the input audio signal is analyzed to determine, whether an acoustic safety incident is given, and if an acoustic safety incident is determined, metadata of the acoustic safety incident is generated.

The communication system and in particular the communication device according to the present aspect and in further embodiments may be configured according to one or more of the embodiments, discussed in the preceding with reference to the preceding aspects. With respect to the terms used for the description of the present aspect and their definitions, reference is made to the discussion of the preceding aspects.

Reference will now be made to the drawings in which the various elements of embodiments will be given numerical designations and in which further embodiments will be discussed.

Specific references to components, process steps, and other elements are not intended to be limiting. Further, it is understood that like parts bear the same or similar reference numerals when referring to alternate figures. It is further noted that the figures are schematic and provided for guidance to the skilled reader and are not necessarily drawn to scale. Rather, the various drawing scales, aspect ratios, and numbers of components shown in the figures may be purposely distorted to make certain features or relationships easier to understand.

FIG. 1 shows a first embodiment of a communication system 1 in a schematic block diagram, also referred to as a "headset system" in the following. The communication system 1 comprises a communication device, namely a headset 2, and a monitoring device/server 4. Headset 2 comprises a user audio output in the form of two headphones 5a, 5b, and a microphone 6, mounted on boom 7. Headset 2 is configured to communicate wirelessly using the Bluetooth protocol with multiple audio sources, also referred to as "communication sources", i.e., in the present embodiment, a smart phone 9, laptop computer 8, and base station 3. It is noted that the base station 3 may also be referred to as a "hub". Each of these communication sources may provide an input audio signal to the headset 2 over corresponding Bluetooth connections, which may be processed by the headset 2 to provide a corresponding audio output to the user. While in a typical operation scenario, only one of these communication sources would be provided to the user, in some embodiments, different audio sources may be mixed by an audio processor 25 (see FIG. 2) of the headset 2, for example for conference calling, so that the audio output is a mix of multiple communication sources. Certainly, a user audio input, obtained from microphone 6 is provided back to the corresponding communication sources over the Bluetooth connection.

Base station 3 provides a Bluetooth connection with headset 2, as shown in FIG. 1, and thus enables the desk phone 10 to wirelessly communicate with the headset 2. Base station 3 certainly could enable other "non-wireless" devices to operate with headset 2. Base station 3 further provides a data connection between headset 2 and monitoring server 4 to transfer metadata and audio snippets of acoustic safety incidents from headset 2 to monitoring server 4.

Figure 2:
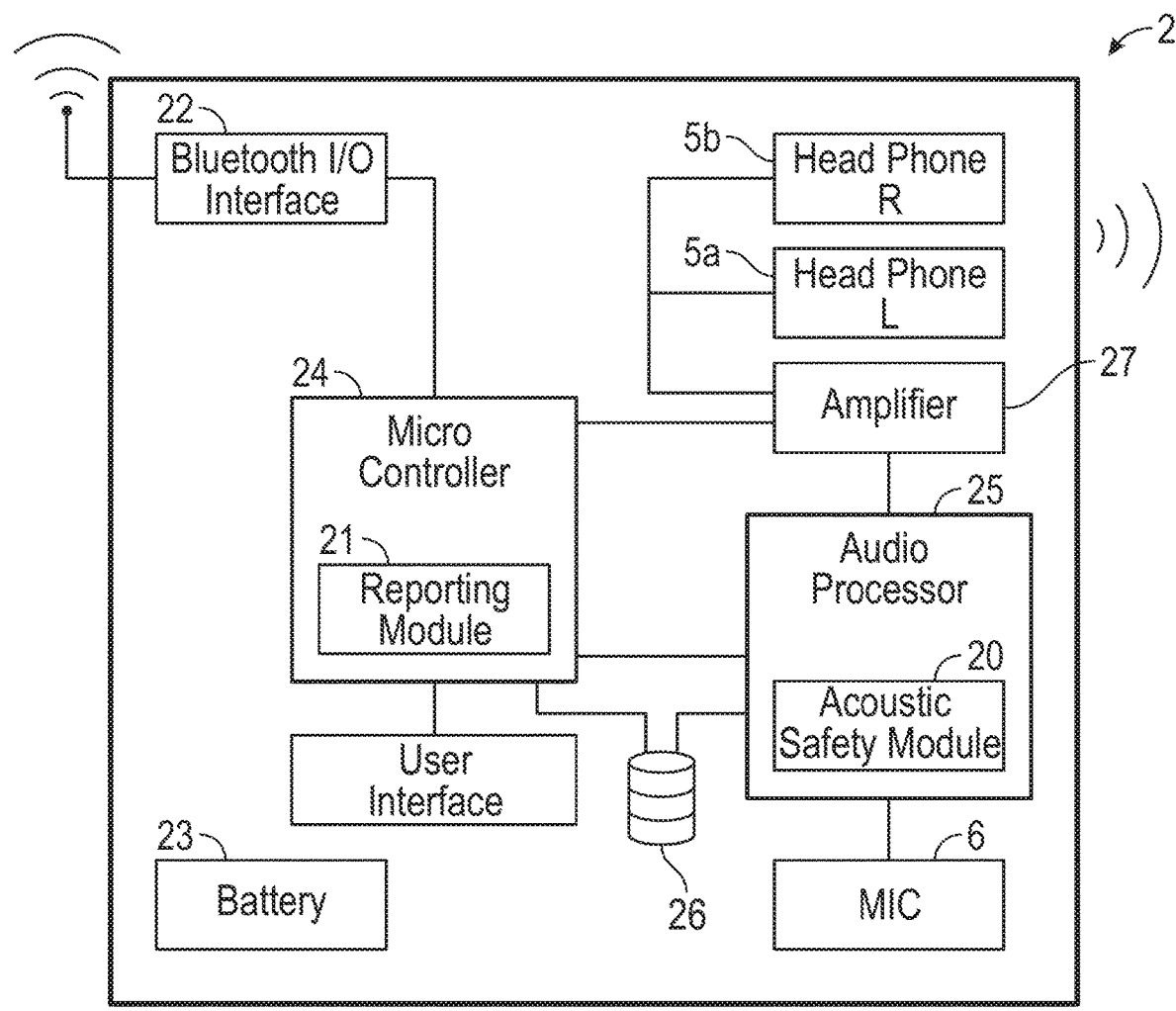
FIG. 2 shows the exemplary headset of the embodiment FIG. 1 in a schematic block diagram.

FIG. 2 shows the embodiment of headset 2 of FIG. 1 in a schematic block diagram. As can be seen from FIG. 2, headset 2 comprises, besides the aforementioned components, microcontroller 24 with a reporting module 21, an audio processor 25 with an acoustic safety module 20, an amplifier 27, and a rechargeable battery 23 to provide all components of headset 2 with operating power. According to the present embodiment, microcontroller 24 is an ST Micro ARM Processor. Audio processor 25 is a DSP (digital sound processor, TMS320, available from Texas Instruments) along with a separate ALIC (Acoustic Limiting Integrated Chip—not shown in the FIGS.) and is configured to receive the input audio signal or stream from a Bluetooth I/O interface 22 and to convert the digital input audio signal into a corresponding analog audio signal for amplifier 27, which drives the headphones 5a, 5b to provide output audio to the user during use. It is noted that in this example, stereo output audio is provided to the user from a digital stereo input audio signal.

As discussed in the preceding, audio processor 25 comprises an acoustic safety module 20 to reduce acoustic shocks to the user during operation, i.e., an event that would result in damage to the user's hearing. The acoustic safety module 20 comprises audio limiter algorithms that are configurable by the monitoring server 4, as will be explained in the following. The acoustic safety module 20 may also be switched off entirely, either by the user, e.g., with connected smart phone 9 or connected laptop 8, or by the monitoring server 4. The latter is particularly beneficial in administered systems, such as, e.g., call centers, where the operator sets up the system. In a default mode of operation, the acoustic safety module 20 uses default limit settings to limit the sound pressure level (SPL) of the output audio. The default limiter settings may comprise a limiting threshold of 102 dB SPL for compliance with the G616 standard.

The above limit and the associated parameters are configurable and mode-switchable, i.e., can be switched on and off, e.g., by the user or by the monitoring server 4. One further limiter algorithm is explained in detail in U.S. published patent application US 2006/0147049 A1.

The audio limiter circuit of the ALIC provides a high anti-startle limit of 118 dB(A) SPL that is an "always on" limit to avoid serious damage to a user's hearing. The high anti-startle limit cannot be disengaged, even in case acoustic safety module 20 is disabled.

It is noted, that the user audio output, i.e., in this embodiment the headphones 5a and 5b, during normal operation are supplied with an audio output signal that is processed by both, the acoustic safety module 20 and the ALIC, except certainly in case the acoustic safety module 20 is switched off, upon with the audio output signal is just processed by the ALIC, but not the acoustic safety module 20. As discussed in the preceding, the headset 2 also comprises the reporting module 21, which is formed as a part of the microcontroller 24. The reporting module 21 may comprise software routines and/or "hardwired" logic circuity to provide its functionality, which is explained in detail in the following.

During use of the headset 2, the reporting module 21 of microcontroller 24 determines, whether an acoustic safety incident is given. To do so, reporting module 21 analyzes the one or more input audio signals and the output audio signal, as provided to the user audio output.

In the present embodiment, reporting module 21 determines the following parameters from the audio signals:

dB SPL levels of the audio signals over time and frequency, and call control events, user interface events, and other audio related metadata from the headset user, such as audio levels of the receive and transmit audio estimated or measured at the input and output of various signal processing modules.

The reporting module 21 in this example determines three common types of acoustic safety incidences from the above data, namely a) impulse noises present in the input audio (also referred to as "anti-startle detection"), b) extremely loud audio levels, and c) continuous noises present in the output audio for prolonged periods.

The last feature effectively helps limit the audio dosage consumed by the headset user, which is also referred to as "time weighted average detection".

Acoustic safety incidences created by impulse noises (e.g., gun-shot sounds, fire-alarm sounds, clicks, and "pops" because of electrical short circuits, etc.) are also sometimes referred to as 'impact' or 'impulsive' noises. These noises are of very short duration and are determined by a peak detector (not shown) of the reporting module 21. Continuous noises last longer in duration than impulse noises. Continuous noises may extend over a few seconds to few hours and are determined by an averaging detector (not shown) of the reporting module 21.

The detector circuits of reporting module 21 also determine, whether the aforementioned limits are exceeded in the input audio signals, namely:

Maximum SPL: 102 dB(A) SPL (anti-startle limit according to G616:2006)

Maximum time-weighted average: 90 dB(A) (USA)/87 dB(A) SPL (EU & AU)

Maximum increase in SPL of approx. 25 dB(A)/50 ms (delta limiter)

In case an acoustic safety incident is given at headset 2, the reporting module generates metadata of the acoustic safety incident, namely dB SPL levels of the audio signals over time and frequency, call control events, user interface events, Receive Automatic Gain Control, headset modeling filter, and other audio related metadata from the headset user, like positive or negative gain applied to any of the signal processing modules. In addition, excerpts from the respective input audio signals and the output audio signal are captured that cover the acoustic safety incident. These excerpts are referred to as "audio snippets" herein. The audio snippets comprise the respective acoustic safety incident as well as a 500 ms lead-in and lead-out time. In the preceding example of impulse noise, such as a gun shot, the audio snippets comprise the impulse noise plus the mentioned lead-in and lead-out time.

The metadata package and the audio snippets are associated with each other using a unique or at least quasi-unique incidence ID. After compressing and encrypting the metadata package and the audio snippets, the resulting data is transmitted to monitoring server 4 for further processing. As will be apparent, the collection and transmission of the audio snippets allows a sound signature detection to identify various attributes about the acoustic incidence. For example, the present embodiments allows acoustic incident classification and acoustic environment identification, both of which options are discussed in more detail in the following.

To be able to obtain the audio snippets, the audio processor 25 is configured to buffer the last few minutes of the input audio signals and the output audio signal in memory 26. This operation corresponds to circular buffer, i.e., a first-in-first-out memory, since a shifting "window" is provided, so that the oldest part of the buffered recording is dropped when new recording time is added. The buffer "depth", i.e., the recording time is configurable and has a default depth of 1 minute. The reporting module 21 accesses this constantly written buffer to extract the audio of the acoustic safety incident including the discussed lead-in and lead-out time (see FIG. 1).

Reverting to FIG. 1, and as discussed in the preceding, once an acoustic safety incident is determined, the resulting metadata package and the associated audio snippets are transmitted to the monitoring server 4 for further processing.

The monitoring server 4 comprises a network interface 14, which in the present embodiment, is a LAN interface. Furthermore, a CPU 15 and a database 16 is provided. Data from the headset 2 is provided to the monitoring server 4 over the Bluetooth connection to base station 3 and the LAN connection 14. The processing on the side of the monitoring server 4 is in the following discussed with reference to the flow diagram of FIG. 3.

In step 30, the data is received by network interface 14 for processing by CPU 15. The monitoring server 4 or more precisely processor 15 is configured to record the acoustic safety incident, its associated metadata and audio snippets in database 16 for future reference in step 31. This recording may be permanent, if necessary, to allow for a later audit In addition, a report is transmitted to the organization's safety officer. In step 32, the CPU 15 first confirms in step 32 the determination of the reporting module 21 that an acoustic safety incident was present. CPU 15 completes an analysis of the input audio signal snippet(s) during this step. CPU 15 uses the following thresholds for the analysis:

a) Maximum SPL: 102 dB(A) SPL (anti-startle limit according to G616:2006)

b) Maximum time-weighted average: 90 dB(A) (USA)/87 dB(A) SPL (EU & AU)

c) Maximum increase in SPL of approx. 25 dB(A)/50 ms (delta limiter)

It is noted that the determination in step 32 primarily serves to check the functionality of reporting module 21. If the reporting module 21 should determine an acoustic safety incident and the determination in step 32 should result in that no acoustic safety incident is given, a malfunction of headset 2 may be given. The monitoring server consequently sends a corresponding message in step 33 to the user and/or the safety officer. For auditing purposes, the result is then recorded in the database 16 in step 34.

If in step 32 the presence of the acoustic safety incident is confirmed, the monitoring server 4 in step 35 conducts an acoustic event classification subroutine. To do so, the audio is analyzed and the cause of the acoustic incident is determined. For example, the following classes are used for the classification:

A) Fax tones, B) Alarms (smoke alarm, fire alarm, etc.) C) Emergency vehicles (ambulance, police, etc.), D) Electronic (static) noise and digital communication artefacts, E) Other noise.

In step 36 it is then determined, whether the occurrence of the respective class of acoustic safety incidents in the past year exceeded a predefined threshold. For example, it may be acceptable for a user to be hearing a number of 3 static noise events. Certainly, the thresholds are defined per user or headset 2 and per class.

If it is determined in step 36 that the limits are exceeded, it is determined if the incident is a "severe incident" in step 37. For example, a static noise event may be classified as a severe incident, while a fax tone may not be classified to be severe.

If a severe incident is given, the headset 2 of the respective user is disabled temporarily as a precaution in step 38. In step 39, the user and the safety office of the organization are informed of the issue so that corrective action can be taken. For example, in case of static noise, the headset 2 or another component in the communication system may be defective and may need servicing. The result of the determination is recorded in database 16 in step 40 and the processing of this acoustic safety incident ends.

If the incident is not determined to be severe, the user and safety officer are informed in step 41 of the issue so that a corrective action can be taken, however, the headset 2 remains active. Again, the result of the determination is recorded in database 16 in step 42.

At last, if the threshold determination in step 36 should not result in that a threshold is exceeded, the result is recorded in database 16 in step 43. The processing then ends.

It is noted that the determination of the presence of a severe incident in step 37 is conducted regardless of whether the acoustic safety module 20 is switched on or off. In case the acoustic safety module 20 is switched on, the presence of a severe incident may be indicative of a malfunction of the acoustic safety module 20 and/or the ALIC or that the parameter of the acoustic safety module 20 need to be adjusted to avoid severe incidents.

Figure 4:
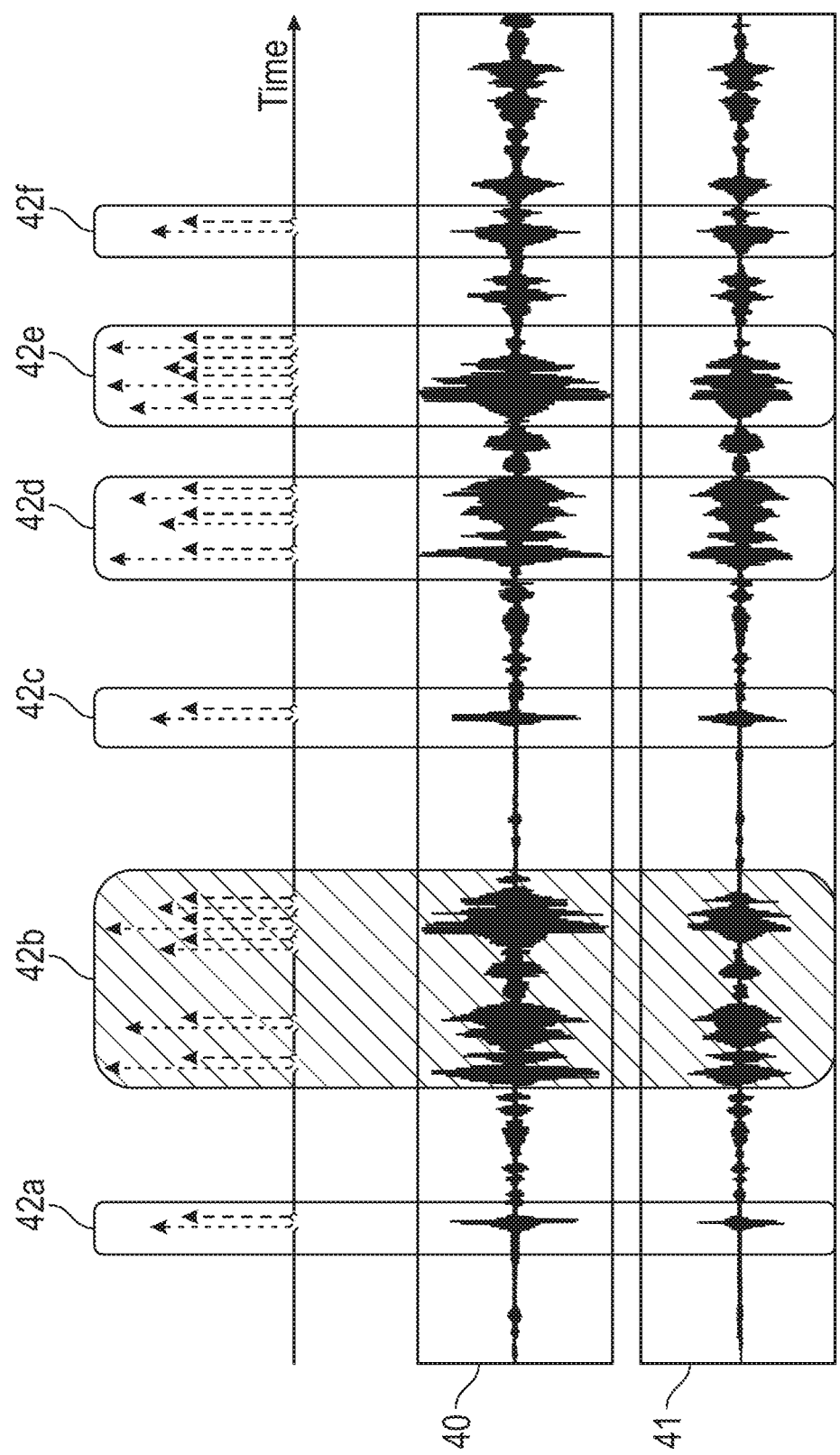
FIG. 4 shows exemplary audio signals.

FIG. 4 shows an exemplary signal chart of an input audio signal 40 and the output audio signal 41, i.e., the signal, that is provided to the user, wearing the headset 2. Marked sections 42a-42f show acoustic safety incidents. Correspondingly, audio snippets of these sections 42a-42f are provided to monitoring server 4. Acoustic safety incident 42b is determined to be a severe incident, resulting in disabling of the headset 2. Acoustic safety incidents 42a and 42c-42f are not determined to be severe, but nevertheless trigger a corresponding message and recording according to steps 41 and 42, discussed in the preceding.

Figure 5:
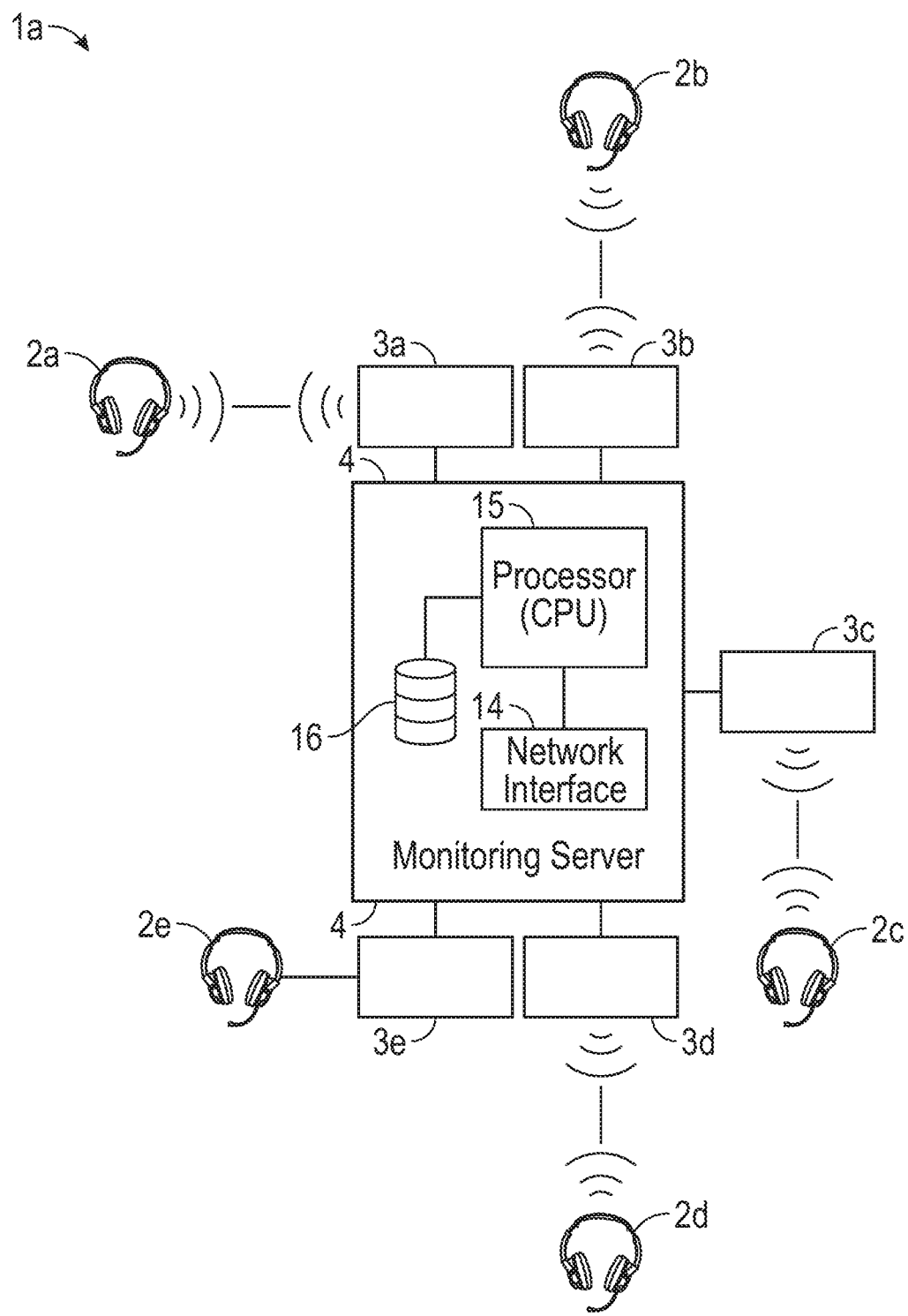
FIG. 5 shows second embodiment of a communication system in a schematic block diagram.

FIG. 5 shows second embodiment of a communication system in a schematic block diagram. According to the embodiment of FIG. 5, communication system 1a comprises multiple headsets 2a-2e, each connected to an associated base station 3a-3e. While the setup of headsets 2a-2d and base station 3a-3d correspond to the setup discussed in the preceding with reference to FIG. 1., headset 2e is connected over a cable connection with base station 3e. Accordingly, the headset 2e and base station 3e do not use the aforementioned Bluetooth connection. The remaining components correspond again to the setup as discussed with reference to FIG. 1.

The operation of headset system 1a and in particular of headsets 2a-2e as well as monitoring server 4 according to the embodiment of FIG. 5 corresponds to the preceding discussion of the embodiments of FIG. 1-4. Obviously, at least some of the headsets 2a-2e now determine, whether an acoustic safety incident is given and then provide metadata and the discussed audio snippets to monitoring server 4.

Figure 6:
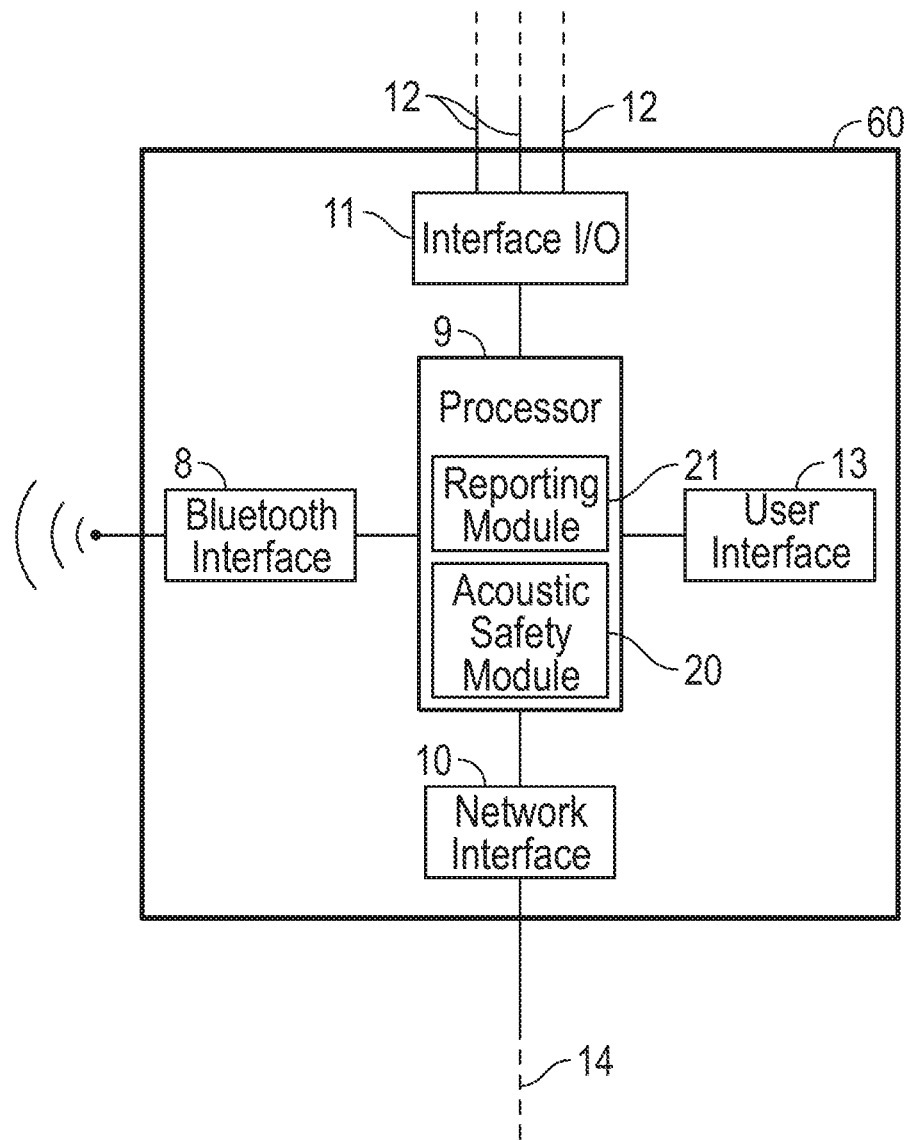
FIG. 6 shows an embodiment of a communication hub.

FIG. 6 shows an embodiment of a communication hub 60, which may be used as a "communication device" in the present context in cases, where a headset 120 (not shown in FIG. 9) does not comprise the reporting and acoustic safety features, discussed in the preceding. Accordingly, the communication hub 60 allows to, e.g., use existing headsets or other audio playback devices, such as conferencing phones, in a communication system according to the present discussion.

Communication hub 60, corresponding to headset 2 of the embodiment of FIGS. 1-2, comprises an acoustic safety module 20 and a reporting module 20, both of which in this embodiment are formed in processor 9. Hub 60 further comprises a corresponding a user interface 13, a user audio output, which in this embodiment is a Bluetooth interface 8 for connection with a headset 120, a network interface 10 for connection with the monitoring server 4 over connection 14, and an I/O interface 11, the latter of which is connectable to one or multiple audio sources (not shown) over audio connections 12 to receive at least one audio signal. The audio sources may comprise "communication sources", such as a phone, e.g., a PSTN (desk) phone, a mobile phone, but also a direct connection to a PSTN line, a VOIP line or interface, and a computer with suitable communication software. The audio connections 12 to the communication sources may for example be provided as USB, Bluetooth (low energy), DECT, Wi-Fi, LAN, or analog connections. It is noted that Bluetooth interface 8 may provide connections to multiple headsets 120 simultaneously to allow conference calls. Instead of or in addition to Bluetooth interface 8, a socket for a cabled headset 120 or other audio playback device may be provided, such as a 3.5 mm headphone jack.

The communication hub 60 of this embodiment provides in essence the functionalities, discussed in the preceding with reference to headset 2. Hub 60 and in particular processor 9 is adapted to process an input audio signal, applied to I/O interface 11, and to provide a processed output audio signal to the headset 120. The output audio signal is then provided to a user using headphones 5a, 5b of a connected headset as output audio. It is noted that in the present context, the output audio is provided to the user during operation, i.e., when the respective user is wearing the respective headset 120. Audio from the user, recorded by a microphone (not shown) of the headset 120 is transmitted to communication hub 60 and then provided to I/O interface 11 for transmission to one or more of the audio sources, as discussed in the preceding with reference to FIGS. 1 and 2. It will be apparent that certainly, the audio source in this embodiment also serves as audio receiver for the user audio.

In addition to the above, hub 60 may also allow to control the headset 120, e.g., using user interface 13. The user interface 13 provides typical functions, including volume adjustment, muting, and selection of the active audio source. User interface 13 of the hub 50 also allows to enable and disable the acoustic safety module 20, which acoustic safety module 20 is provided to reduce events of acoustic shock to the user during operation. The operation of acoustic safety module 20 and reporting module 21 corresponds to the operation discussed in the preceding with reference to FIGS. 1-5.

Figure 7:
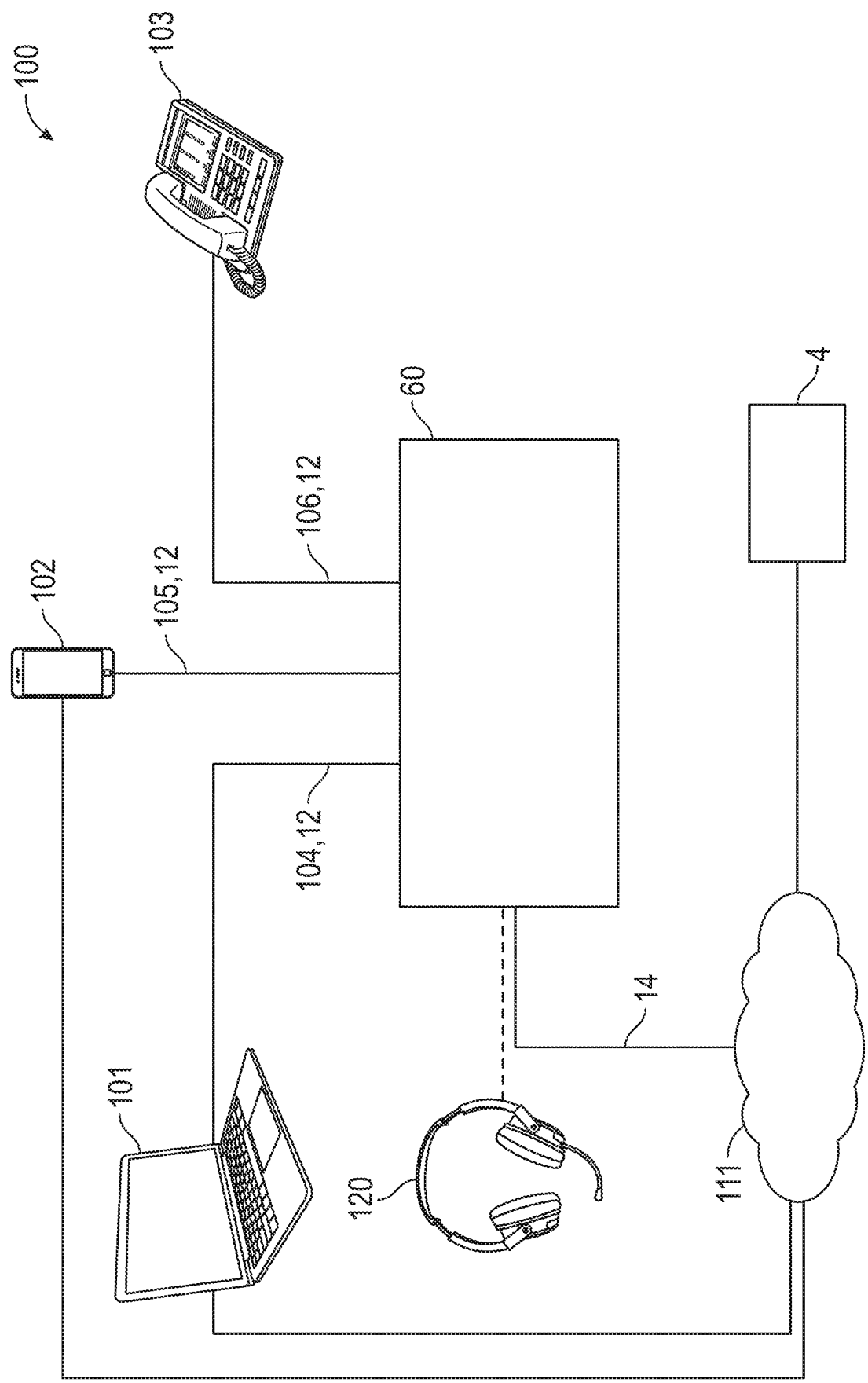
FIG. 7 shows an embodiment of a communication system with the communication hub of FIG. 6.

FIG. 7 shows an embodiment of a communication system 100 with the communication hub 60 of FIG. 6. Here, the communication hub 60 is connected with multiple audio sources 101, 102, and 103 over the corresponding audio connections 12.

As shown in FIG. 10, a laptop computer 101 with a VOIP application is connected with headset hub 60 over a USB connection 104. Additionally, a smart phone 102, and a desk (PSTN) phone 103 are connected with headset hub 60. Smart phone 102 is connected with hub 60 using a Bluetooth connection 105, while desk phone 103 is connected using a provided headset/handset socket of desk phone 103 and a corresponding analog audio connection 106. As will be apparent, audio is transmitted over USB connection 104, wireless Bluetooth connection 105, and analog audio connection 106, which thus simultaneously serve as audio connections 12.

The user of hub 60 is able to select the desired audio source using user interface 13, as discussed in the preceding.

The connection 14 to monitoring server 4 is a network connection, e.g., a TCP/IP Internet connection using network interface 10 (not shown in FIG. 10) over the Internet 111.

Figure 8:
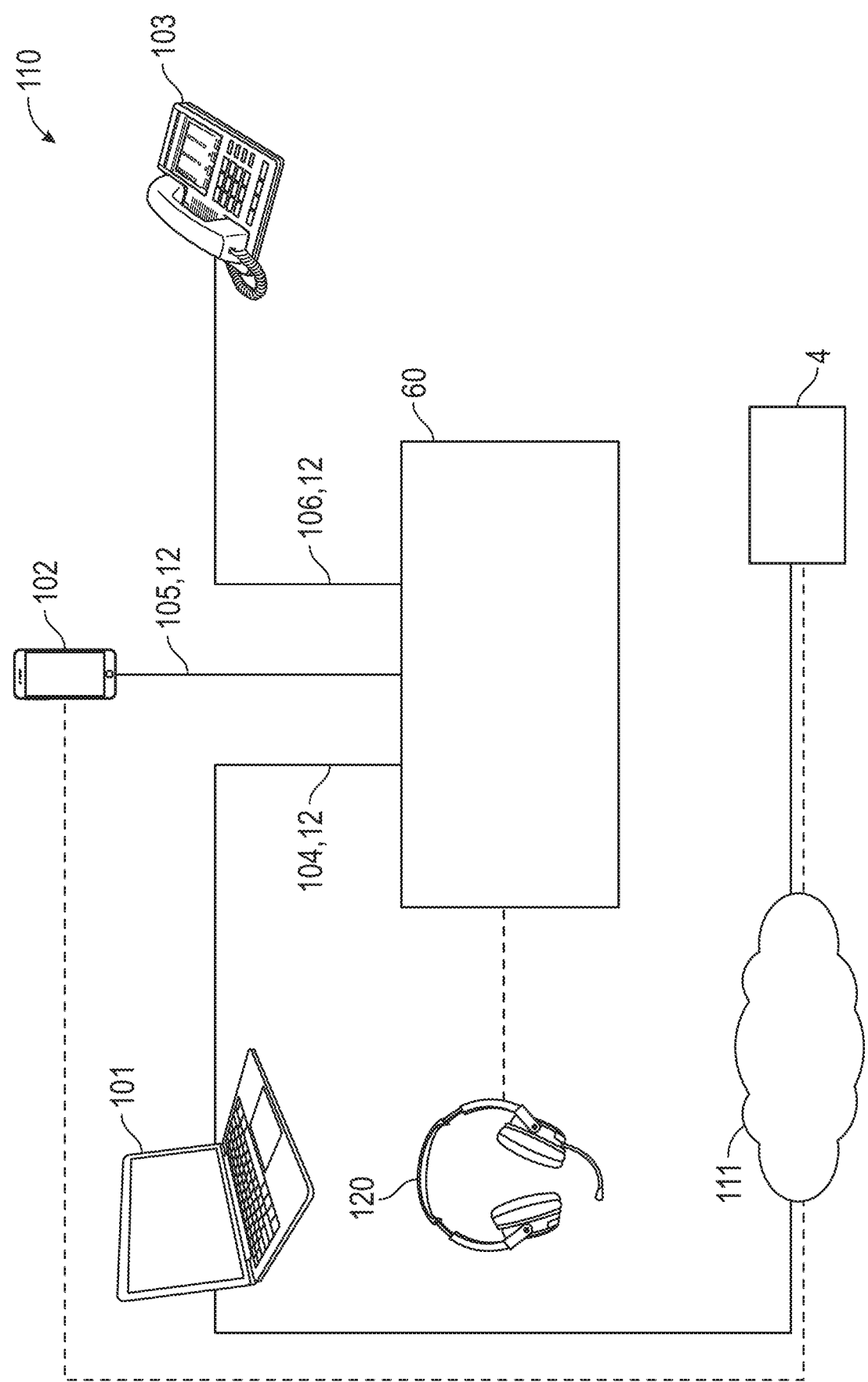
FIG. 8 shows another embodiment of a communication system with the communication hub of FIG. 6.

FIG. 8 shows another embodiment of a communication system 110 with the communication hub 60 of FIG. 6. The present embodiment corresponds to the embodiment of FIG. 7 with the exception of the connection to monitoring server 4. Instead of the hub 60 comprising a network interface, a connection to monitoring server 4 is established in this embodiment over laptop computer 101, i.e., the already established USB connection 104. The laptop computer 101 is connected to the Internet 111 and thus indirectly establishes a connection between the hub 60 and the monitoring server 4 to, e.g., transmit the collected metadata.

Alternative to a connection over laptop computer 101, the smart phone 102 could establish a connection between hub 60 and monitoring server 4, as indicated by the dashed line. Also here, the hub 60 would use the existing Internet connection of the smart phone 102. The communication between smart phone 102 and hub 60 is conducted over Bluetooth connection 105, as discussed in the preceding. In both examples, the laptop computer 101 and the smart phone 102 thus act as "intermediate device" to facilitate communication between hub 60 and monitoring server 4. This may be particularly useful in applications, where hub 60 has no direct LAN connection or no network interface.

Figure 3:
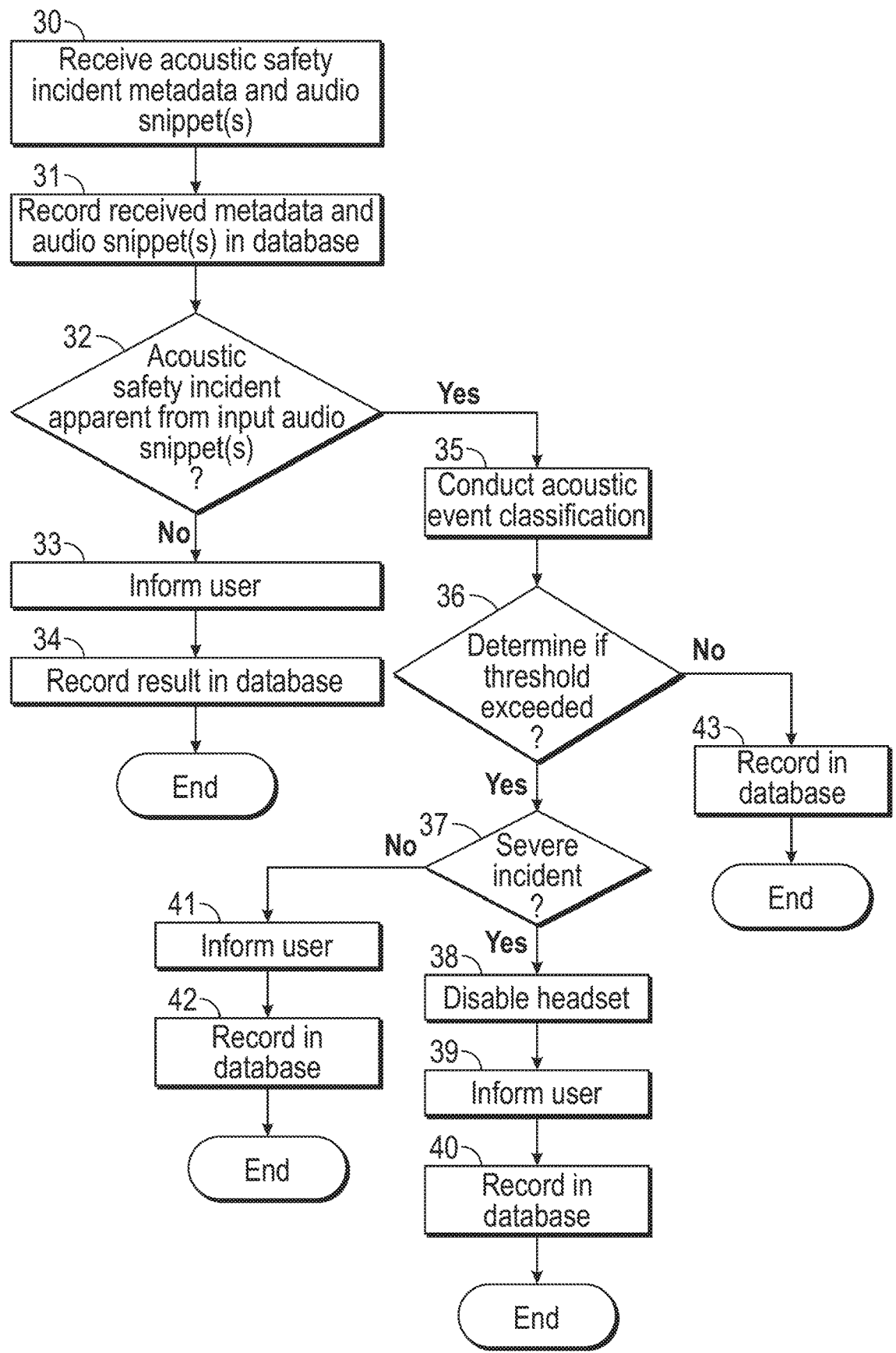
FIG. 3 shows the operation of the monitoring server of the embodiment of FIG. 1 in a schematic flow diagram.

While the invention has been illustrated and described in detail in the drawings and foregoing description, such illustration and description are to be considered illustrative or exemplary and not restrictive; the invention is not limited to the disclosed embodiments. For example, it is possible to operate the invention in any of the preceding embodiments, wherein instead of the connections between headset 2 and smart phone 9, laptop 8, and base station 3 being formed using the Bluetooth protocol, the connections being formed using Wi-Fi, DECT, or any other suitable wireless or wired, i.e., conductor-based communications protocol;

instead of LAN connection 14, the connection between base station 3 and monitoring server 4 is a direct WAN connection, e.g., a wired (e.g., T1, E1, DSL, Cable) or wireless (e.g., 4G or LTE) connection;

instead of LAN connection 14 being connecting the headset 2 with the monitoring server 4 over base station 3, the LAN connection 14 is formed using smart phone 9 or laptop 8 as an intermediate device;

instead of LAN connection 14 being connecting the headset 2 with the monitoring server 4 over base station 3, the LAN connection 14 is formed directly between headset 2 and monitoring server 4 by a Wi-Fi module of the headset 2;

the audio sources comprise additional communication sources, such as a phone, e.g., a PSTN (desk) phone, a mobile phone, a direct connection to a PSTN line, a VOIP line or interface, and/or a computer with suitable communication software;

the communication hub 60 being formed integrally with a computing device, such as a laptop or desktop computer or a mobile phone;

processor 9 of communication hub 60 provides the functionality of a softphone client, which is connected with the I/O interface 11 to at least provide an input audio signal;

the monitoring server 4 is a cloud-based server;

the steps of configuring, enabling, and disabling the acoustic safety module are selective, i.e., one or more of the discussed maximum SPL limiter, anti-startle level limiter, duration limiter, and delta limiter are configured, enabled, or disabled in dependence of the type of acoustic safety incident;

with reference to FIG. 3, the determination of a severe incident in step 37 additionally or alternatively comprises a determination of a predefined regularity, a predefined duration, and/or whether the second, predefined threshold, i.e., a severe acoustic safety threshold, which is higher than the predefined audio safety threshold, was exceeded;

referring to the embodiments of FIGS. 7 and/or 8, instead of USB connection 104, a Bluetooth or Wi-Fi connection is used as audio connection to laptop 101;

referring to the embodiments of FIGS. 7 and/or 8, instead of Bluetooth connection 105, a USB or Wi-Fi connection is used as audio connection to smart phone 102;

referring to the embodiments of FIGS. 7 and/or 8, instead of analog audio connection 106, a USB or Bluetooth connection is used as audio connection to desk phone 103, and/or referring to the embodiment of FIG. 8, instead of the metadata being transmitted over USB connection 104 or Bluetooth connection 105, data is carried over an alternate communication link to the monitoring server 4 via internet 111.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit may fulfill the functions of several items recited in the claims.

The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

What is claimed is:

1. A communication device for a communication system, the communication device having at least
    an I/O interface for connection with one or more audio sources to at least receive an input audio signal;
    a user audio output;
    an audio processor to provide an output audio signal to the user audio output from the input audio signal; and
    a reporting module, configured to analyze the input audio signal and to determine, whether at least one acoustic safety incident is given, upon which the reporting module is configured to generate metadata of the acoustic safety incident wherein
    the reporting module is further configured to capture an input audio snippet of the input audio signal upon determination of the acoustic safety incident.

2. The communication device of claim 1, wherein the metadata comprises at least a sound pressure level of the acoustic safety incident.

3. The communication device of claim 1, wherein the communication device is further configured to transmit the metadata to a monitoring device of the communication system.

4. The communication device of claim 1, wherein the reporting module is further configured to transmit the metadata and the input audio snippet to a monitoring device of the communication system.

5. The communication device of claim 1, wherein the input audio snippet has a capture recording length that covers at least the acoustic safety incident.

6. The communication device of claim 1, wherein the input audio snippet has a capture recording length that covers the acoustic safety incident and a predefined lead-in and lead-out time.

7. The communication device of claim 6, wherein the lead-in and lead-out time is between 1-2000 ms.

8. The communication device of claim 6, wherein the lead-in and lead-out time is 500 ms.

9. The communication device of claim 1, wherein the audio processor comprises an acoustic safety module, the acoustic safety module being configured to process the input audio signal to obtain the output audio signal so as to reduce acoustic shocks.

10. The communication device of claim 1, wherein the communication device is one of a headset and a communication hub.

11. A communication system with at least one communication device
and a monitoring device, the communication device having at least
an I/O interface for connection with one or more communication sources to at least receive an input audio signal;
a user audio output;
an audio processor to provide an output audio signal to the user audio output from the input audio signal; and
a reporting module, configured to analyze the input audio signal and to determine, whether at least one acoustic safety incident is given, upon which the reporting module is configured to generate metadata of the acoustic safety incident and to capture an input audio snippet of the input audio signal; wherein the reporting module is further configured to transmit the metadata and the input audio snippet to the monitoring device.

12. The communication system of claim 11, wherein the reporting module is further configured to capture an output audio snippet of the output audio signal upon determination of the acoustic safety incident and to transmit the metadata, the input audio snippet, and the output audio snippet of the acoustic safety incident to the monitoring device.

13. The communication system of claim 12, wherein the monitoring device is configured to conduct one or more of an acoustic incident classification and an acoustic environment identification from one or more received audio snippets.

14. A method of operating a communication device, the communication device having at least an I/O interface for connection with one or more communication sources for at least receiving an input audio signal, a user audio output, and an audio processor to provide an output audio signal to the user audio output from the input audio signal; wherein the input audio signal is analyzed to determine, whether at least one acoustic safety incident is given, and if the acoustic safety incident is determined, metadata of the acoustic safety incident is generated and an input audio snippet of the input audio signal is captured.

15. A communication device for a communication system, the communication device having at least
an I/O interface for connection with one or more audio sources to at least receive an input audio signal;
a user audio output;
an audio processor to provide an output audio signal to the user audio output from the input audio signal; and
a reporting module, configured to analyze the input audio signal and to determine, whether at least one acoustic safety incident is given, upon which the reporting module is configured to generate metadata of the acoustic safety incident; wherein
the reporting module is further configured to capture an output audio snippet of the output audio signal upon determination of the acoustic safety incident.

16. The communication device of claim 15, wherein the reporting module is further configured to transmit the metadata and the output audio snippet of the acoustic safety incident to a monitoring device of the communication system.

17. The communication device of claim 15, wherein the reporting module is further configured to capture an input audio snippet of the input audio signal upon determination of the acoustic safety incident.

18. The communication device of claim 17, wherein the reporting module is further configured to transmit the metadata, the input audio snippet and the output audio snippet of the acoustic safety incident to the monitoring device of the communication system.

19. A communication system with at least one communication device and a monitoring device, the communication device having at least
an I/O interface for connection with one or more communication sources to at least receive an input audio signal;
a user audio output;
an audio processor to provide an output audio signal to the user audio output from the input audio signal; and
a reporting module, configured to analyze the input audio signal and to determine, whether at least one acoustic safety incident is given, upon which the reporting module is configured to generate metadata of the acoustic safety incident and to capture an output audio snippet of the output audio signal; wherein the reporting module is further configured to transmit the metadata and the output audio snippet to the monitoring device.

20. A method of operating a communication device, the communication device having at least an I/O interface for connection with one or more communication sources for at least receiving an input audio signal, a user audio output, and an audio processor to provide an output audio signal to the user audio output from the input audio signal; wherein the input audio signal is analyzed to determine, whether at least one acoustic safety incident is given, and if the acoustic safety incident is determined, metadata of the acoustic safety incident is generated and an output audio snippet of the output audio signal is captured.

* * * * *